United States Patent

[11] 3,586,272

| [72] | Inventor | Kenneth Pestell<br>Sussex, England |
|---|---|---|
| [21] | Appl. No. | 851,600 |
| [22] | Filed | Aug. 20, 1969 |
| [45] | Patented | June 22, 1971 |
| [73] | Assignee | The Rother Iron Works Limited<br>Rye, Sussex, England |
| [32] | Priority | Sept. 5, 1968 |
| [33] | | Great Britain |
| [31] | | 42168/68 |

[54] RESILIENT MOUNTING ASSEMBLIES
5 Claims, 3 Drawing Figs.
[52] U.S. Cl. .................................................. 248/22,
    267/65, 267/118
[51] Int. Cl. .................................................. F16f 15/00
[50] Field of Search .................................. 248/8, 9,
    358, 15, 22, 24, 213; 267/31, 65, 32, 34, 35, 64,
    122, 118

[56] References Cited
UNITED STATES PATENTS

| 1,374,780 | 4/1921 | Thompson.................... | 267/65 |
| 2,904,302 | 9/1959 | Cavanaugh et al. .......... | 248/358 |
| 3,066,929 | 12/1962 | Gregoire ...................... | 267/31 |

FOREIGN PATENTS

| 585,911 | 11/1958 | Italy .............................. | 248/24 |

*Primary Examiner*—J. Franklin Foss
*Attorney*—Flynn & Frishauf

ABSTRACT: A resilient mounting assembly adapted for use in mounting a vibratory frame relative to a supporting frame in vibratory apparatus comprises a generally rigid cup-shaped member and a generally flexible cup-shaped member which is open towards the rigid member and cooperates with the rigid member to define therewith an airtight space containing air under pressure to provide said flexible member with resilience.

RESILIENT MOUNTING ASSEMBLIES

This invention is concerned with improvements in or relating to resilient e.g. vibratory mounting assemblies.

Resilient mounting assemblies are used in many types of vibration apparatus such, for example, as devices for shaking and packing powders in containers, ball mills, sieves or strainers, ore concentrators, and shaking tables.

These types of apparatus are generally referred to herein as "vibratory apparatus of the kind specified."

It is an object of the present invention to provide vibratory apparatus comprising at least three improved resilient mounting assemblies.

The invention provides a resilient mounting assembly adapted to mount one component relative to another component, the assembly comprising a generally rigid member adapted to be mounted to one component and a generally flexible member which is adapted to be mounted to the other components, is open towards the rigid member and cooperates with the rigid member to define therewith a fluid-tight space adapted to contain fluid (which may be a gas or a liquid but is preferably a gas) under pressure to provide said flexible member with resilience.

The flexible member is generally cup-shaped the cup shape being open towards the rigid member.

The resilient mounting assemblies according the invention are incorporated in vibratory apparatus of the kind specified comprising a vibratory frame mounted on a supporting frame of the apparatus by at least three such resilient mounting assemblies. When the rigid members of the mounting assemblies are mounted to the vibratory frame, the rigid members may for example be integral with the vibratory frame or individually secured thereto.

There now follows a description, to be read with reference to the accompanying drawings, of apparatus embodying the invention. This description is given by way of example of the invention only and not by way of limitation thereof.

Figure 1:
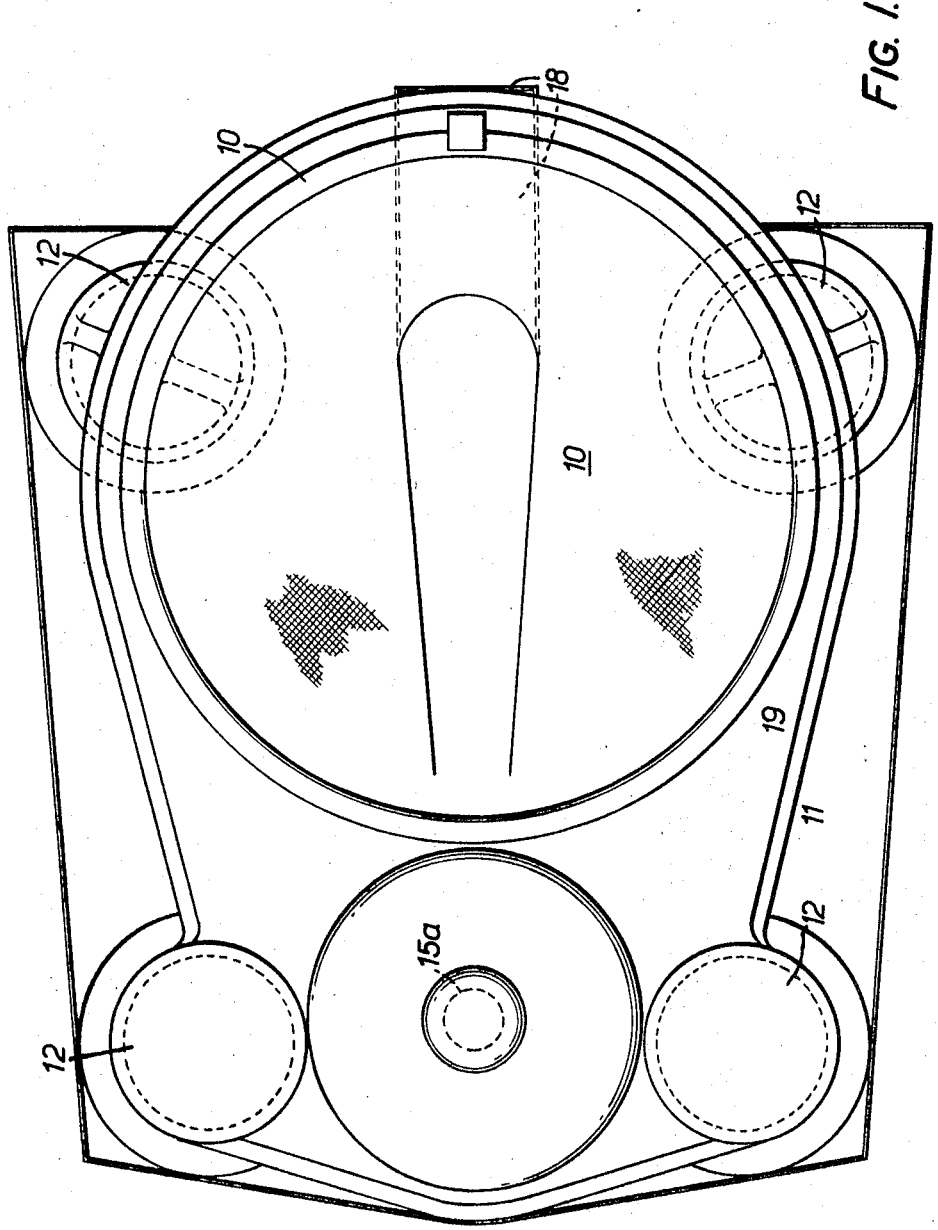
FIG. 1 shows a plan view of the apparatus embodying the invention.

The apparatus comprising a circular sieve or strainer 10 mounted about a vertical axis thereof upon a vibratory frame 11 which is adapted to be vibrated and is mounted on a supporting frame 16 by four separate spaced-apart resilient mounting assemblies 12. An out of balance weight 15 is mounted on a vertical shaft 15a which is mounted for rotation in a roller bearing 15b and a ball bearing 15c mounted in the frame 11. The shaft 15a is driven in the operation of the apparatus by an electric motor 13 which is mounted in the frame 16 and is arranged to drive the shaft 15a via a belt 14, a vertical stub shaft 14a mounted in the frame 16 by ball bearings 14b and a flexible power transmission assembly 17 details of which per se form no part of the present invention. The axis of the shaft 15a is offset from the axis of the sieve or strainer 10 in side view but is aligned therewith in end view.

The sieve or strainer 10 is provided with a discharge outlet 18 for the sieved or strained material and another outlet (not shown) could be provided at a location for continuous removal of the oversize particles.

Figure 2:
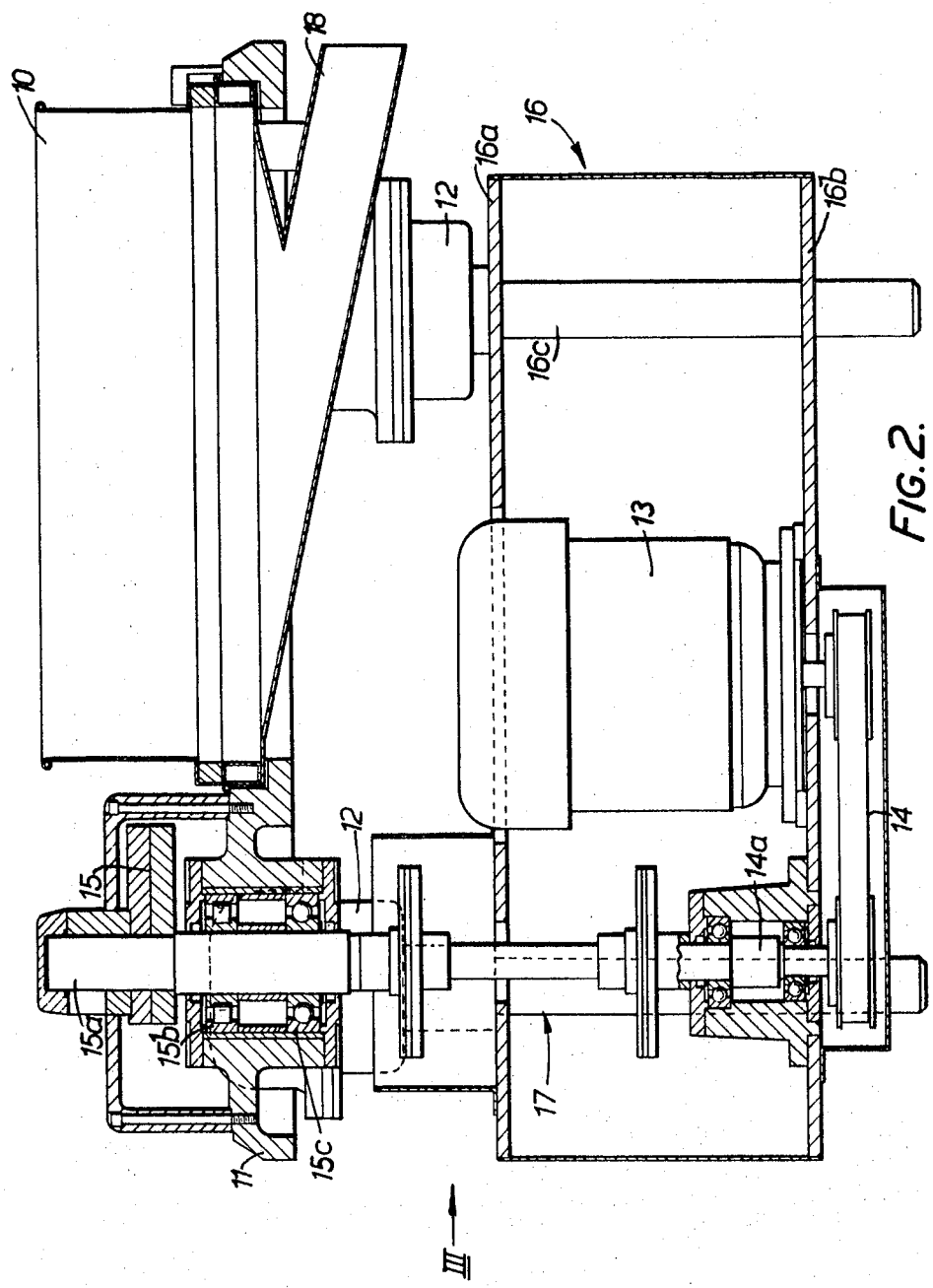
FIG. 2 shows a sectional side view of the apparatus.
Figure 3:
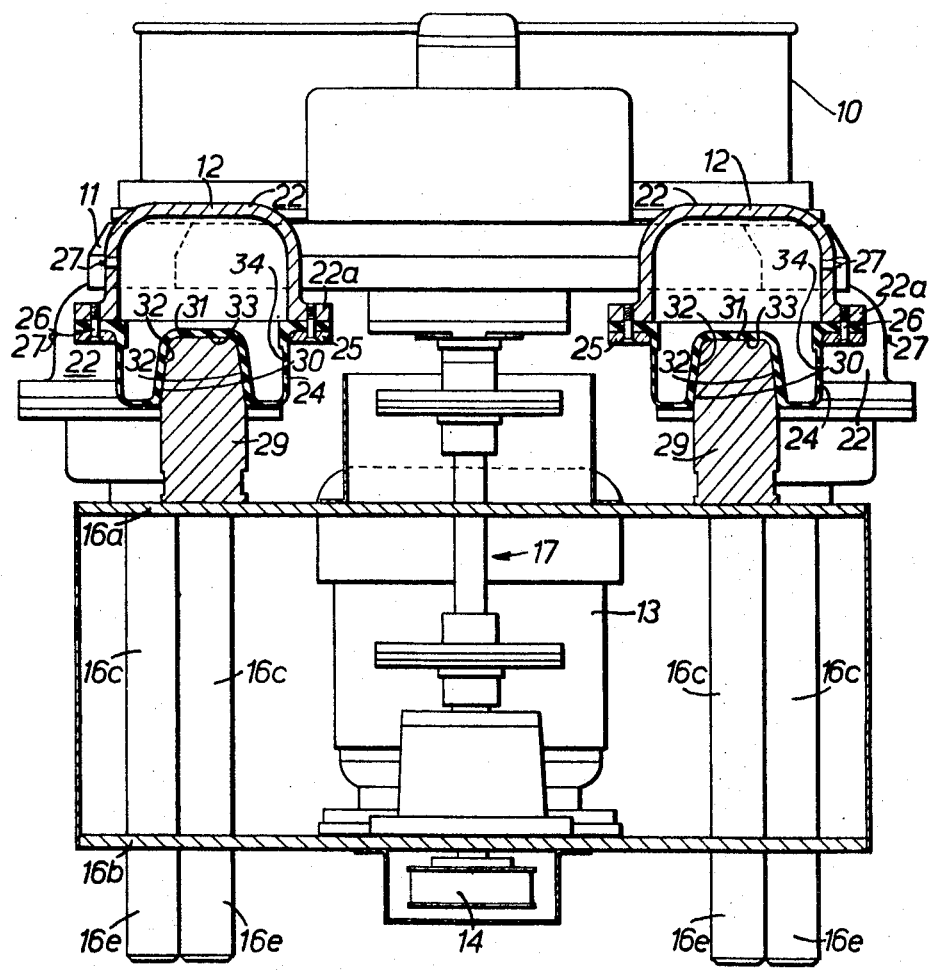
FIG. 3 shows a sectional end view of the apparatus generally in the direction of the arrow III in FIG. 2.

The assemblies 12 are in plan view located at the four corners of a trapezium (FIG. 1), symmetrically to either side of the sieve or strainer 10 and to the axis of the shaft 15a the two assemblies 12 closest to the sieve or strainer 10 being spaced further apart than the other two assemblies 12, and also being located at a lower level than the other two assemblies 12 (see FIGS. 2 and 3).

The frame 16 comprises an upper horizontal member 16a and a lower horizontal member 16b which are braced together by four vertical rod members 16c. Each rod member 16c has a downward extension 16e screwed onto it below the frame member 16b and the downward extensions 16e provide supporting legs for the apparatus.

Each assembly 12 comprises a rigid inverted cup-shaped member 22 carried by the frame 11. The member 22 is flanged at 22a and the marginal portion 13 of a generally flexible member 24 is sandwiched between the flange and an annulus 25 which is secured to said flange 22a by screws 26 or other fixing means. The member 24 is generally cup shaped and is made of an elastomeric material e.g. natural or synthetic rubber and it will be noted that the member 22 is located above the member 24. It will also be noted that the flexible member 24 is not itself totally enclosed, the cup shape being open towards the rigid member 22. The flexible member 24 cooperates with the rigid member 22 to define therewith an airtight space containing air under pressure to provide the flexible member 24 with resilience.

The inverted cup-shaped member 22 is also open towards the member 14. The member 22 is provided with an inflation valve 27.

Each rod member 16c has an upward extension 29 screwed onto it above the frame member 16a; each extension 29 is received in a frustoconical externally reentrant portion 32 of one of the members 24, the two extensions 29 associated with the lower two assemblies 12 being of course shorter than the other two extensions 29. An outer frustoconical surface 30 of each extension 29 and possibly also a flat end surface 31 of each extension 29 is coated or otherwise provided with a material which will reduce the friction and consequent wear to which the corresponding surfaces 32 and 33 of the appropriate assembly 12 are subjected when the vibratory frame 11 is caused to vibrate. For example each of said extensions 29 may be coated with a layer of P.T.F.E., or with a layer of any other synthetic resin material which has properties similar to those of P.T.F.E., insofar as reduction of friction is concerned. Alternatively, for example the surfaces 32 and 33 of each assembly 12 may have bonded or otherwise secured thereto a cup-shaped metal liner which is intended to contact the surfaces 30 and 31 of the member 29; a lubricant can be applied to the surfaces of said metal liner and of the extensions 29 in order to reduce friction.

An outer cylindrical wall 34 of each member 24 is of reduced cross section compared with other portions of the member 24 so that the majority of the flexing of the member 24 occurs in the wall 34.

In a modification of the apparatus, the shaft 15a is arranged to be coaxial with the axis of the sieve or strainer 10 instead of being offset therefrom.

I claim:

1. In vibratory apparatus of the kind specified comprising a supporting frame (16) and a vibratory frame (11), the improvement comprising the combination of:

at least three support members (29) projecting from one frame (16) towards the other frame (11); and at least three spaced-apart resilient mounting assemblies (12) mounting said vibratory frame (11) on said supporting frame (16), each mounting assembly (12) being associated with a respective one of said support members (29) and each mounting assembly (12) including:

a generally rigid member (22) mounted to said other frame (11); and a generally cup-shaped flexible member (24) mounted to said one frame (16), the cup shape being open toward said rigid member (22) and cooperating with said rigid member (22) to define therewith a fluidtight space adapted to contain a fluid under pressure to provide said flexible member (24) with resilience, said flexible member (24) having in all conditions thereof an externally reentrant portion (32) which receives one of said support members (29) and an outer substantially cylindrical wall (34) or reduced cross section so that the majority of the flexing of said flexible member (24) occurs in said cylindrical wall (34).

2. Apparatus according to claim 1 wherein said rigid member (22) is cup-shaped and is open towards said flexible member (24).

3. Apparatus according to claim 1 wherein said fluidtight space is adapted to contain a gas.

4. Apparatus according to claim 1 wherein each mounting assembly the rigid member (22) is located generally above the flexible member (24).

5. Apparatus according to claim 1 wherein said supporting frame (16) comprises a plurality of upright bracing members (16c) and said at least three support members (29) are extensions of said bracing members.